UNITED STATES PATENT OFFICE.

CLIFFORD RICHARDSON, OF WASHINGTON, DISTRICT OF COLUMBIA, ASSIGNOR OF ONE-HALF TO HENRY L. CRANFORD, OF SAME PLACE.

PAVING COMPOSITION.

SPECIFICATION forming part of Letters Patent No. 409,504, dated August 20, 1889.

Application filed April 5, 1889. Serial No. 306,086. (No specimens.)

*To all whom it may concern:*

Be it known that I, CLIFFORD RICHARDSON, a citizen of the United States, residing at Washington, in the District of Columbia, have invented certain new and useful Improvements in Paving Compositions; and I do hereby declare the following to be a full, clear, and exact description of the invention, such as will enable others skilled in the art to which it appertains to make and use the same.

My invention is based on the utilization of the discoveries of Rabe for neutralizing and refining the acid-tar or sludge-acid of the petroleum-refineries, as described fully in the *Journal of the Society of Chemical Industry*, published by Eyre and Spottiswoode, London, April 30, 1888, which process produces a bitumen of very pure quality having qualities very desirable for paving purposes when subsequently used as a cement by my method, which I will proceed to describe. I take the refined Rabe tar, as above prepared, freed from acid and refined to a suitable consistency—about that of oiled Trinidad asphalt, as now commonly used for paving-cement—and mix it in a melted condition by suitable means with hot sand and broken or ground rock in about the following proportions: refined acid-tar of Rabe, eight (8) to fourteen (14) per cent.; sand and crushed rock, or either of them, ninety-two to eighty-six per cent. I may also use, in combination with the bodies above named, asbestus or other suitable mineral, and when such additional bodies are used the proportions will be about as follows: refined acid-tar of Rabe, from eight (8) to fourteen (14) per cent.; sand and crushed rock or either of them, seventy-five (75) to eighty-seven (87) per cent., and asbestus or other mineral, from three (3) to nine (9) per cent., the result forming a mixture to be applied as a wearing-surface to any suitable or well-known base or foundation, either in sheet or in block form. I also use a cement in the above mixture instead of the refined Rabe acid-tar alone, a mixture of this with Trinidad asphalt, or Trinidad asphalt which has been oiled with petroleum-residuum oil, so varying the proportions in accordance with the varying density of the materials as to make the resulting mixed cement of the proper consistency for use in the surface mixture as a paving-cement. I also use the acid Rabe petroleum-tar when refined only to a density and consistency corresponding to petroleum residuum of from 16° to 22° Baumé, for the purpose of making a paving-cement, in combination with refined Trinidad asphalt, after the manner practiced at present with residuum of petroleum and as a substitute therefor, the resulting cement being used in the mixture above described to form a paving-surface composition, and forming a most valuable combination.

The peculiar advantages derived from the use of Rabe acid-tar are due to the following characteristics, viz: The only bituminous cements hitherto used on paving-surfaces with any success are coal-tar and natural asphalts. These possess disadvantages, in that coal-tar is composed of material which readily oxidizes on exposure to the weather, becoming brittle, and in cold weather wearing away by attrition, asphalt, on the other hand, containing foreign organic matter which soaks up water, and, rotting, disintegrates the surface in the gutters where much exposed to wet. The Rabe tar, on the contrary, is the product of the refinery of petroleum, and is free from both of these defects, as it contains no foreign matter and consists of the stable hydrocarbons of the paraffine series, which do not oxidize readily.

I do not confine myself to exact proportions, but vary them in accordance with the varying quality of the material and the place where the surface is to be laid, preserving the proper relations to produce a surface to withstand traffic, &c.

I claim—

1. A wearing-surface mixture suitable to be laid upon any proper base or made into paving blocks or tiles, composed of the refined Rabe acid-tar of the proper consistency and mineral matter, as above described.

2. A wearing-surface, as above, the cement of which is a mixture of asphalt and refined Rabe tar, substantially as and for the purpose hereinbefore set forth.

3. A wearing-surface mixture, as above, in which the cement is Trinidad or other asphalt, mixed with the Rabe acid-tar refined to a consistency corresponding to petroleum-residuum oil, and used in the same manner as the petroleum-residuum oil for imparting the proper tenacity, toughness, and consistency to the asphalt.

In testimony whereof I affix my signature in presence of two witnesses.

CLIFFORD RICHARDSON.

Witnesses:
JOSEPH PARRIS,
LOUIS P. DOWE.